US010979384B2

(12) United States Patent
Fregly (10) Patent No.: US 10,979,384 B2
(45) Date of Patent: Apr. 13, 2021

(54) SYSTEMS AND METHODS FOR PRESERVING PRIVACY OF A REGISTRANT IN A DOMAIN NAME SYSTEM ("DNS")

(71) Applicant: VERISIGN, INC., Reston, VA (US)

(72) Inventor: Andrew Fregly, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 57 days.

(21) Appl. No.: 15/080,850

(22) Filed: Mar. 25, 2016

(65) Prior Publication Data
US 2017/0279762 A1    Sep. 28, 2017

(51) Int. Cl.
*H04L 29/12* (2006.01)
*H04W 12/02* (2009.01)
*H04L 29/06* (2006.01)

(52) U.S. Cl.
CPC ........ *H04L 61/1511* (2013.01); *H04L 61/302* (2013.01); *H04L 63/0421* (2013.01); *H04L 63/06* (2013.01); *H04W 12/02* (2013.01)

(58) Field of Classification Search
CPC ......... H04L 61/1511; H04L 4163/0421; H04L 63/06; H04L 61/302; H04L 63/0421; H04W 12/02
See application file for complete search history.

(56) References Cited

U.S. PATENT DOCUMENTS

| 6,560,634 | B1 * | 5/2003 | Broadhurst | ............. H04L 29/06 709/203 |
| 9,563,763 | B1 * | 2/2017 | Roth | ....................... G06F 21/36 |
| 2004/0064561 | A1 * | 4/2004 | Parsons | ............. H04L 29/12594 709/226 |
| 2005/0138144 | A1 * | 6/2005 | Sethi | ................. H04L 29/12132 709/219 |
| 2005/0289084 | A1 * | 12/2005 | Thayer | .................. H04L 9/3268 705/67 |

(Continued)

OTHER PUBLICATIONS

Hoffman et al. "Using Secure DNS to Associate Certificates with Domain Names for S/MIME", Feb. 24, 2016.*

(Continued)

*Primary Examiner* — Umar Cheema
*Assistant Examiner* — James Ross Hollister
(74) *Attorney, Agent, or Firm* — MH2 Technology Law Group, LLP (57) ABSTRACT

Provided is a method of provisioning a named resource in a domain name system ("DNS") with a registrar while preserving privacy of a registrant. The method includes obtaining, by a server of the registrar over a network, a request, from the registrant, to provision the named resource; determining, by at least one hardware processor of the server of the registrar, that the request requires additional handling by a privacy provider based on information in the request or information from the registrar; determining, by at least one hardware processor of the server of the registrar, a privacy provider from one or more privacy providers located in different geographic locations to service the request based on a location of the registrant; forwarding the request to the privacy provider; obtaining a cloaked identifier from the privacy provider; and provisioning the named resource in a database of a DNS registry using the cloaked identifier.

15 Claims, 7 Drawing Sheets

(56) References Cited

U.S. PATENT DOCUMENTS

| | | | |
|---|---|---|---|
| 2006/0168020 A1* | 7/2006 | Brennan, III | H04L 29/12047 709/206 |
| 2012/0005720 A1* | 1/2012 | McGloin | G06F 21/6263 726/1 |
| 2016/0140159 A1* | 5/2016 | Gupta | H04L 61/302 707/609 |
| 2017/0279617 A1* | 9/2017 | Blinn | H04L 9/3247 |

OTHER PUBLICATIONS

Hoffman et al. "Using Secure DNS to Associate Certificates with Domain Names for S/MIME", Feb. 24, 2016 (Year: 2016).*

Hidden "Hidden Registration", http://hiddenregistration.com/details.html, http://hiddenregistration.com/faq.html, http://hiddenregistration.com/contact.html. Captured Jun. 14, 2007. (Year: 2007).*

Extended European Search Report dated May 19, 2017, European Application No. 17161192.4, pp. 1-9.

Extended European Search Report issued in corresponding European Patent Application No. 18 19 8415 dated Nov. 21, 2018, pp. 1-8.

* cited by examiner

SYSTEMS AND METHODS FOR PRESERVING PRIVACY OF A REGISTRANT IN A DOMAIN NAME SYSTEM ("DNS")

FIELD

The present disclosure relates generally to preserving privacy of a registrant in DNS.

BACKGROUND

The Domain Name System (DNS) is the part of the Internet infrastructure that translates human-readable domain names into the Internet Protocol (IP) numbers needed to establish TCP/IP communications over the Internet. That is, DNS allows users to refer to web sites, and other resources, using easier to remember domain names, such as "www.en.example.com," rather than the numeric IP addresses, such as "123.4.56.78," which are machine readable addresses used by software to communicate with computers on the Internet. Each domain name is made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g., "example" in "www.example.com." Each second-level domain can include a number of third-level domains located immediately to the left of the second-level domain, e.g., "en" in "www.en.example.com." There can be additional level domains as well, with virtually no limitation. For example, a domain with additional domain levels could be www.landscape.photos.example.com.

It should be noted that a single IP address, e.g., a single server, can support numerous domain names. That is, different domain names may resolve to the same server, that can then determine what content to provide based on the requested domain name and/or additional non-domain information. This is sometimes referred to as virtual hosting.

Additional non-domain information may be included in a Uniform Resource Identifier ("URI") structure that includes the domain name. For example, a "path" part is a sequence of segments separated by a forward slash ("/"). This information may be included immediately to the right of the domain name, such as the "blog" in "www.example.com/blog/today.htm," and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page.

The Internet Corporation for Assigned Names and Numbers ("ICANN") is responsible for managing the assignment of domain names and IP addresses. The responsibility for operating each TLD is delegated by ICANN to an organization known as a domain name registry operator. ("registry"). For example, VeriSign, Inc. is the registry operator for the .com TLD. Each registry operator maintains a registry database of all domain names registered in a top-level domain for which it is responsible. A registry database record can map a domain name to an IP address of a name server. When a domain name query is submitted to the registry, the registry returns the IP address of the name server, which can contain another record with further address information about the Internet resource that corresponds to the queried domain name. The process of responding to a domain name query with an IP address is called "resolving" the domain name.

The actual registration of domain names is performed by companies referred to as domain name registrars ("registrars"). Registrars register domain names with registries. For example, an end user submits to a registrar a domain name for registration and provides an IP address to which the domain name should resolve. The registrar communicates with the registry to create a registry database record that can be used to resolve the domain name to the IP address provided by the end user and indicates the identity of the registrar through which the domain name was registered. Except for the expiration of the domain name registration at the registry, only the registrar designated in the domain name record at the registry can modify or delete registry database information about a domain name. An end user can switch registrars by following certain domain transfer procedures.

A zone file is a text file that describes a portion of the domain name system (DNS) called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data such as the IPv4 address for A records. Comments can be included by using a semi-colon and lines can be continued by using parenthesis. There are also file directives that are marked with a keyword starting with a dollar sign.

A Whois system is a query/response protocol that is used for querying a database in order to determine the owner of a domain name, an IP address, or an autonomous system number on the Internet. Traditionally, Whois lookups were made using a command line interface. However, several simplified web-based tools currently exist for looking up domain ownership information using the Whois system. Typically, when a user queries the Whois system, a web-based Whois client will utilize the Whois protocol to connect to a Whois server. Lookups of the requested information will then be returned to the user. The Whois system provides a number of useful functions including providing contact information for network operators and administrators. Additionally, using the Whois system, a user is able to determine the availability of a particular domain name. Registration data access protocol ("RDAP") is a next generation replacement for Whois and is specified as a suite Internet Request for Comments (RFC) documents: RFC 7480—HTTP Usage in the Registration Data Access Protocol (RDAP); RFC 7481—Security Services for the Registration Data Access Protocol (RDAP); RFC 7482—Registration Data Access Protocol (RDAP) Query Format; RFC 7483—JSON Responses for the Registration Data Access Protocol (RDAP); RFC 7484—Finding the Authoritative Registration Data (RDAP) Service; and RFC 7485—Inventory and Analysis of WHOIS Registration Objects.

In a typical domain name registration example, a registrant may want to reserve the domain name "example.com." The registrant would contact a registrar that has a business relationship with the registry that operates the .com TLD. The registrant would query the registrar as to the availability of the domain name "example" in the ".COM" namespace. The registrar in turn would query the proper registry through the EPP, and then return the results to the registrant. The registrar may then obtain a registration of the domain name by paying a registration fee and providing information required by the registry and registrar. The registry charges the registrar for the domain name registration and the registrar collects the registration fee from the registrant.

The registrar has a relationship with both the registrant and the registry, but the registry only has a direct relationship with the registrar. The registry can be a "thin registry," storing no information about the registrant, or a "thick registry," storing contact or other information about the registrant. Any information stored about the registrant may be obtained through the registrar. Thus, from the registry's perspective, the owner of the domain is the registrar.

Thick Whois providers, such as registrars, are required by ICANN to collect and store personal information from registrants. This personal information may later be exposed by services, such as Thick Whois, to requesting parties that in some jurisdictions, i.e., the EU, may be considered private and therefore should not be exposed. This is a requirement in registrar and registry agreements with ICANN. These requirements are currently in conflict with EU law that prevents the disclosure of personally identifying data except in specific circumstances. EU law also restricts storage of personal information outside the EU to localities that have gone through a process to be granted the right to store EU personal information. "Safe Harbor" laws and classification of organization within a country or countries as not being "safe harbor" limit areas where personal information can legally be stored. The EU ruled in late 2015 that the U.S. was no longer considered a "safe harbor" for organizations to store private information for EU citizens. "Safe harbor" organizations include both organizations that are legally recognized by the jurisdiction of the registrant as "safe harbor" and organizations in jurisdictions that do not need special provisions to store the private information of the registrant, such as organizations in the EU that store private information of EU citizens. The EU has since created a new process by which U.S. organizations can gain the right to store private information for EU citizens, but the costs and audit requirements of this process make it questionable as to how many U.S. organizations will want to go through the process. The conflicting legal and ICANN contractual requirements for storage and exposure of Thick Whois data are a challenge for Thick Whois providers and may be a problem for RDAP providers as it is phased in to replace Thick Whois. Thus, there is need for systems and method to provide Thick Whois or RDAP services that overcome the aforementioned problems.

SUMMARY

According to examples of the present disclosure, a method of provisioning a named resource in a domain name system ("DNS") with a registrar while preserving privacy of a registrant is provided. The method includes obtaining, by a server of the registrar over a network, a request, from the registrant, to provision the named resource; determining, by at least one hardware processor of the server of the registrar, that the request requires additional handling by a privacy provider based on information in the request or information from the registrar; determining, by at least one hardware processor of the server of the registrar, a privacy provider from one or more privacy providers located in different geographic locations to service the request based on a location of the registrant; forwarding the request to the privacy provider that was determined; obtaining a cloaked identifier from the privacy provider; and provisioning the named resource in a database of a DNS registry using the cloaked identifier.

In some examples, the privacy provider is located in a legal jurisdiction that can provide privacy services based on the legal jurisdiction or jurisdictions applicable to the registrant.

In some examples, the request to provision does not contain information identifying the registrant.

In some examples, the method can further include registering the cloaked identifier and a public key of the registrant in the DNS registry.

In some examples, the method can further include generating or provisioning the public key or a public key certificate for the registrant.

In some examples, the cloaked identifier and the public key of the registrant is registered in the DNS registry using a secure/multipurpose internet mail extensions ("S/MIME") A-type DNS resource record.

In some examples, the method can further include obtaining, by the registrar, another request, from the registrant, to provision the named resource using the cloaked identifier.

In some examples, the cloaked identifier is be used as the identity of the registrant to contact the registrant without revealing the true identity of the registrant.

According to examples of the present disclosure, a method of providing privacy services to a registrant for provisioning a named resource with a registrar in a domain name system ("DNS") is provided. The method includes obtaining, by a server of a privacy provider over a network, a request for a cloaked identifier from the registrant, wherein the request comprises identifying information for the registrant; verifying the identifying information; generating, by a hardware processor of the server of the privacy provider, the cloaked identifier for the registrant; and providing the cloaked ID to the registrant and the registrar over a network.

In some examples, the method can further include obtaining a public cryptographic key of the registrant.

In some examples, the method can further include registering the cloaked identifier and the public key of the registrant in a DNS registry.

In some examples, the cloaked identifier and the public key of the registrant is registered in the DNS registry using a secure/multipurpose internet mail extensions ("S/MIME") A-type DNS resource record.

In some examples, the method can further include storing the identifying information within a jurisdiction where it is legally allowed to be stored.

In some examples, the obtaining the request is forwarded from the registrar.

In some examples, the verifying the identifying information further includes providing a challenge to the registrant, wherein the challenge comprises an action to be performed by the registrant and obtaining, in response to the challenge, an answer that comprises an indication that the action was performed.

In some examples, the identifying information includes information that is required as part of a domain registration process or contact information for the registrant.

In some examples, the registering is provided to the registrar.

In some examples, the privacy provider is located in a legal jurisdiction that can provide privacy services based on the legal jurisdiction or jurisdictions applicable to the registrant.

In some examples, the method further includes generating or provisioning the public key or a public key certificate for the registrant.

According to examples of the present disclosure, a computer system is disclosed that comprises at least one hardware processor that is operate to execute instructions stored in a non-transitory computer-readable medium to perform one or more of the methods provided herein.

According to examples of the present disclosure, a non-transitory computer-readable medium is disclosed that can store instructions to perform one or more of the methods provided herein by at least one hardware processor.

It is to be understood that both the foregoing general description and the following detailed description are exemplary and explanatory only and are not restrictive of the implementations, as claimed.

DETAILED DESCRIPTION

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Generally speaking, the present disclosure is directed to a solution that can be implemented as a service to solve problems related to honoring restrictions on the storage of personal information and also to honor international laws that restrict exposure of personal information. Provided herein is a solution to addresses the problem described above by defining a method by which personal information collection is delegated to privacy providers residing in a locality where it is legal to store the personal information. This addresses the problem of adhering to privacy laws by automating the production of a 'cloaked identity' that only the privacy provider knows is associated with the person. This cloaked identity can then be given to the person who's identity is being cloaked and to various entities that need to associate some form of identity with data or a service the cloaked person is registering. The cloaked identity is not associated with the personal information of the person except within the data storage of the privacy provider, and the privacy provider will not disclose that information unless a legal mechanism applicable to the locality of the privacy provider is used. The person's private or personal information is therefore shielded except in cases where it is legally retrieved from the privacy provider.

In some examples, the cloaked identity can include a cloaked email address. If the cloaked identity is a unique cloaked email address, several other benefits are possible. The cloaked email address can be used to communicate with the person without having personal information being accessible by a party that knows the cloaked email address unless they go through a legally accepted process to get it from the privacy provider. If the cloaked email address and the public key for a person is recorded in an secure/multipurpose internet mail extensions ("S/MIME") A-type record (also called a S/MIMEA) in a DNS server under a domain owned by the person, then proof of origin of data and email from the person can be enabled using digital signature. Proof of origin for an email is achieved if the person has used their private key to sign an email sent using the cloaked email account and a recipient uses the person's public key received from the S/MIMEA record for the cloaked email account to verify the person's digital signature. A similar process is used to verify signed data. Other mechanism can be used that do not rely on S/MIMEA records for verifying a digital signature. For example, the registrant can provide a public key certificate, such as a X.509 certificate, to the privacy provider or the registrar, which is signed by a trusted third party, such as a certificate authority, to exchange the public keys needed for signature verification.

Figure 1:
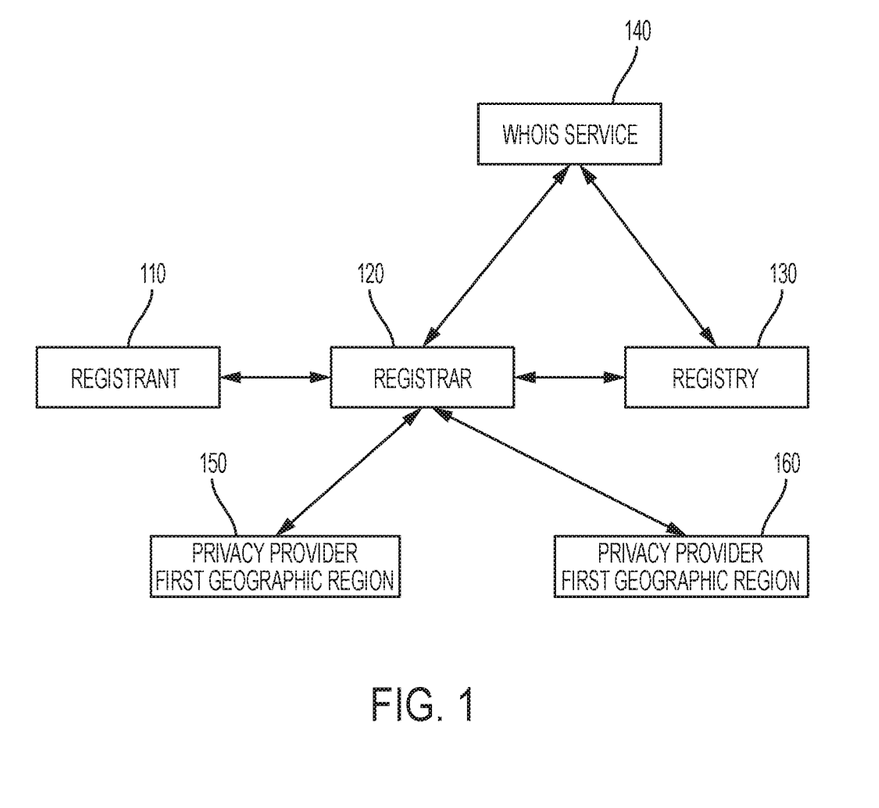
FIG. 1 illustrates the data flow and relationship definition of the three primary parties involved in a domain registration.

FIG. 1 illustrates the data flow and relationship definition of the three primary parties involved in a domain registration. The registrant 110 is typically an end user of the domain, but in some cases, may resell the domain to either another registrant in a domain transfer transaction or may retain ownership of the domain but let a third party use it, as when the registrant is a web hosting provider and the third party is a customer of the registrant. Moreover, some registrants never intend to use a domain in a traditional fashion. Some registrants hope to reserve desirable domain names that they can sell for a profit and some registrants reserve names that are slight variations of popular websites, hoping to receive Internet traffic from people mistyping the URL of the popular website. Some registrants will find new ways to use the domain name system other than for the traditional use of hosting websites associated with the domain name that directs a user to a website.

Registrants 110 requests domain names from registrars 120. Thus, the registrant's 110 relationship is primarily with the registrar 120. The registrar 120, however, maintains a relationship with one or more registries 130 that control the TLD for which registration is desired. Typically, large registrars have multiple relationships with many registries to assure they can provide registrants with many TLD domain options when reserving their domains. The abstraction between the registry 130 and registrant 110 is convenient to the registrant because the registrant 110 can register all or most of its domain names from one registrar 120, rather than having to have multiple relationships with multiple registries 130.

Registries 130 control the assignment of domain names. A registry is responsible for assuring that domain information is accurate and up to date. Further, the registry is responsible for providing first level DNS support for the TLD. For example, the registry that manages the .ORG TLD must provide (or otherwise make available) a DNS server containing nameserver information for a domain name registered through the registry so that when a website is requested via the domain name in a URL, the proper nameserver will eventually respond to the request, by providing a fully resolved domain name (that is, resolved to the IP address of the machine designated as responsible to respond for the domain name). Registrar 120 and registry 130 each comprise one or more computers to implement the functions described herein, and may correspond to functions and structures disclosed below.

The registry 130 can include one or more registry servers comprising a processor, memory, and local storage. Registration programs are executed on the server to provide specific functionalities of the provisioning system. The provisioning system comprises one or more data repositories containing one or more storage devices to store domain records and administrative records. The provisioning system may be made of one, few, or many individual servers and each server may be optimized to run particular registration programs. The servers may also be configured to communicate with each other such that server resources are evenly distributed among many servers.

The registrar 120 and the registry 130 can communicate with a Whois service 140 to provide answers to requestors for information stored therein. Privacy providers 150 located in a first geographic region and privacy provider 160 located in a second geographic region can communicate with the registrar 120. As discussed further below, the registrar 120 can determine which privacy provider 150, 160 to direct registrant 110 to that can store private or personal information of the registrant 100 while maintaining the "safe harbor" provisions.

Figure 2:
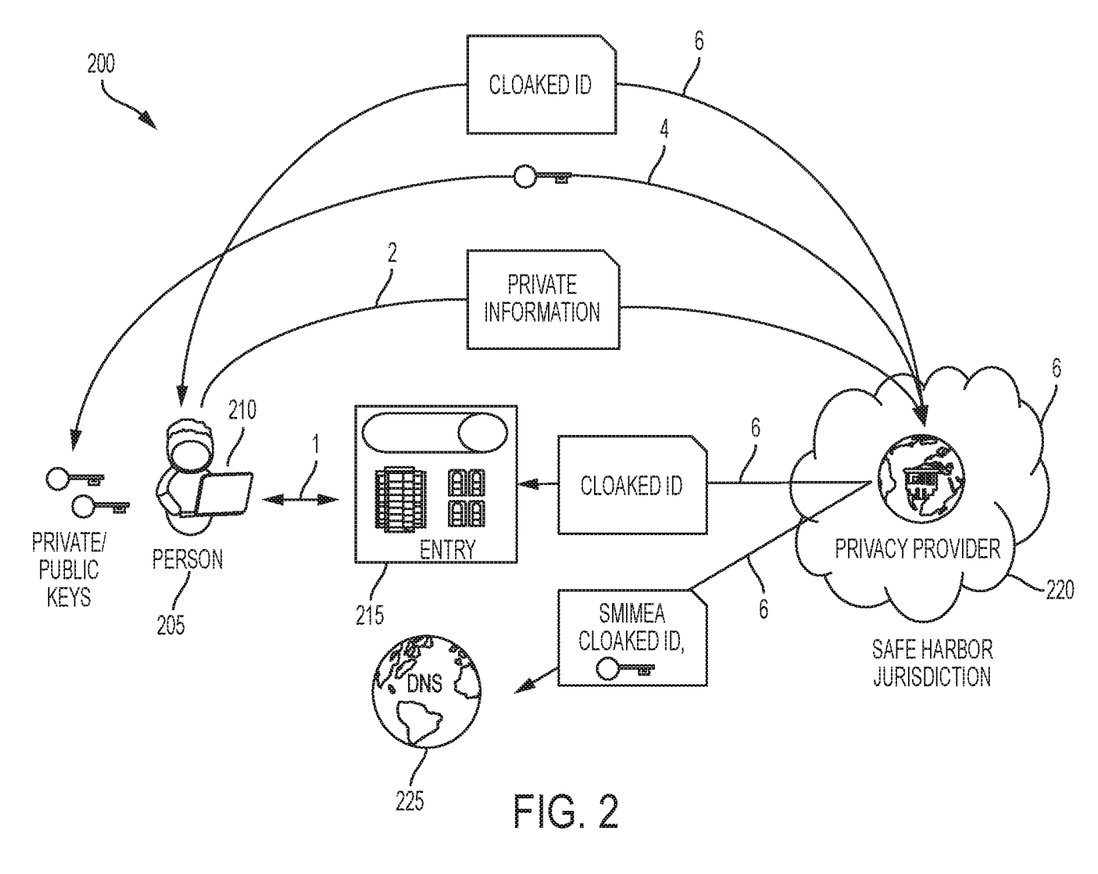
FIG. 2 shows an example provisioning process, according to examples of the present disclosure.

FIG. 2 shows an example provisioning process 200, according to examples of the present disclosure. A registrant 205, at a client device 210 communicates, over a network, and sends a request for provisioning named entity, i.e., a domain name, with a registrar 215 (shown be arrow 1). The registrant 205 can be in a jurisdiction that requires privacy and the registrar 215 and the DNS registry 225 is not. The private information of the registrant 205 may be subject to restrictions of a jurisdiction and a DNS registry 225 is not capable of meeting those restrictions due to location of the DNS registry 225, lack of having established itself as a safe harbor, or other reasons. Based upon information included in the request, such as location information for the registrant 205 and/or client device 210, the registrar 215 can redirect the request to a privacy provider 220 who collects private information of the registrant 205 (shown as arrow 2). The privacy provider 220 is located in a "safe harbor" jurisdiction and verifies the private information of the registrant 205 (shown as arrow 3). Registrant 205 provides a public key to the privacy provider 220 (shown as arrow 4). The privacy provider 220 generates a cloaked ID and registers the cloaked ID and the public key of the registrant 205 into a DNS registry 225 with, for example, a S/MIMEA record (shown as arrow 5). The cloaked ID is an identifier that is not publically associable to the actual identity of the person (entity), i.e., registrant 205, to which it applies. The privacy provider 220 provides the cloaked ID to the registrant 205 and the registrar 215 (shown as arrow 6). In some examples, the registrant can provide a public key certificate, such as a X.509 certificate, to the privacy provider or the registrar, which is signed by a trusted third party, such as a certificate authority, to exchange the public keys needed for signature verification.

Figure 3:
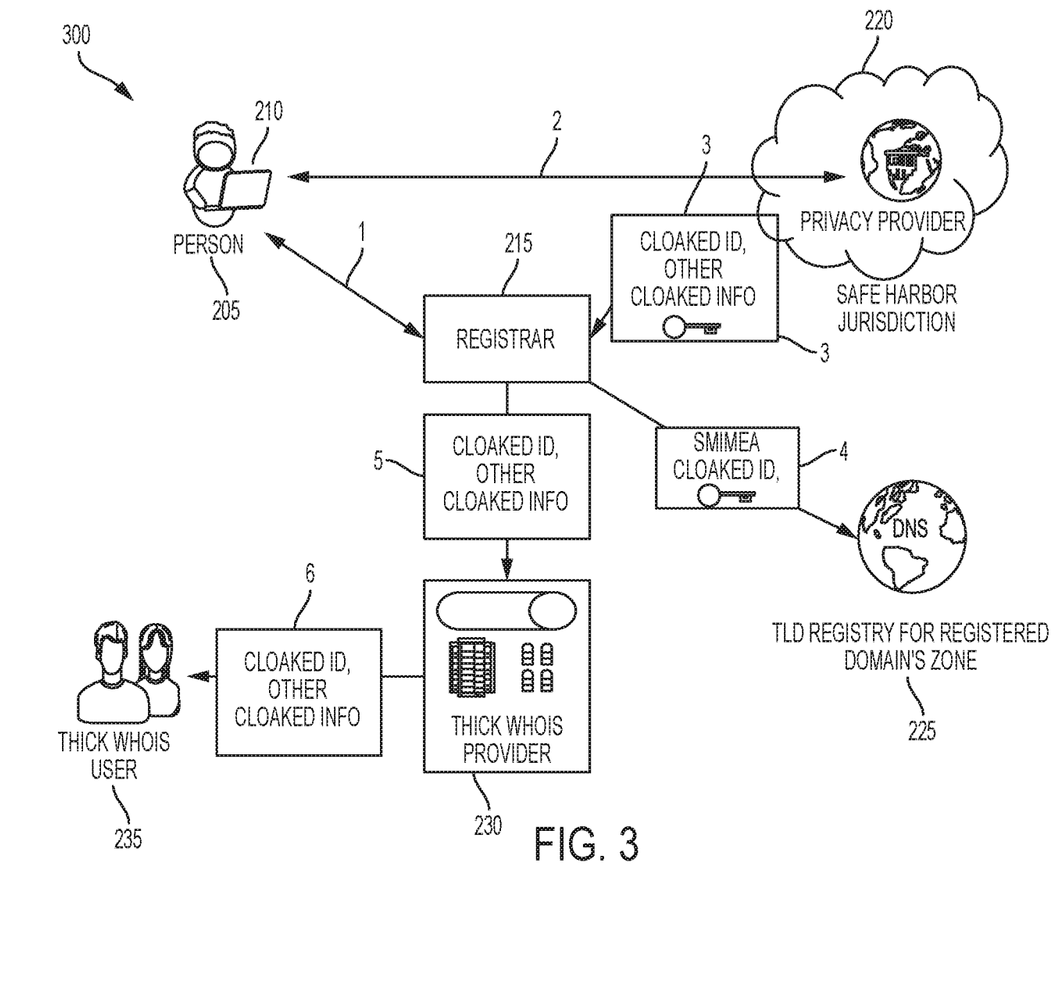
FIG. 3 shows an example provisioning process, according to examples of the present disclosure.

FIG. 3 shows an example provisioning process 300, according to examples of the present disclosure. A registrant 205, at a client device 210 communicates, over a network, and sends a request for provisioning named entity with a registrar 215 (shown by arrow 1). Based upon information included in the request, such as location information for the registrant 205 and/or client device 210, the registrar can redirect the request to a privacy provider 220 who collects and verifies the private information of the registrant 205 and, optionally, obtains the public key of the registrant 205 (shown as arrow 2). The privacy provider 220 generates a cloaked ID and provides the cloaked ID and additionally provides an email address for the registrant 205 based on the cloaked ID, the public key, and other cloaked information, such as contact information for the privacy provider 220 to the registrar 215 (shown as arrow 3). The registrar 215 interacts with the DNS registry 225 to create one or more DNS entries, such as a S/MIMEA record for the email address of the cloaked ID (shown as arrow 4). The registrar 215 provides the cloaked ID and other cloaked information to a Thick Whois provider 230 (shown as arrow 5). Thick Whois users 235 can only see the Cloaked ID and Other Cloaked information (shown as arrow 6).

Figure 4:
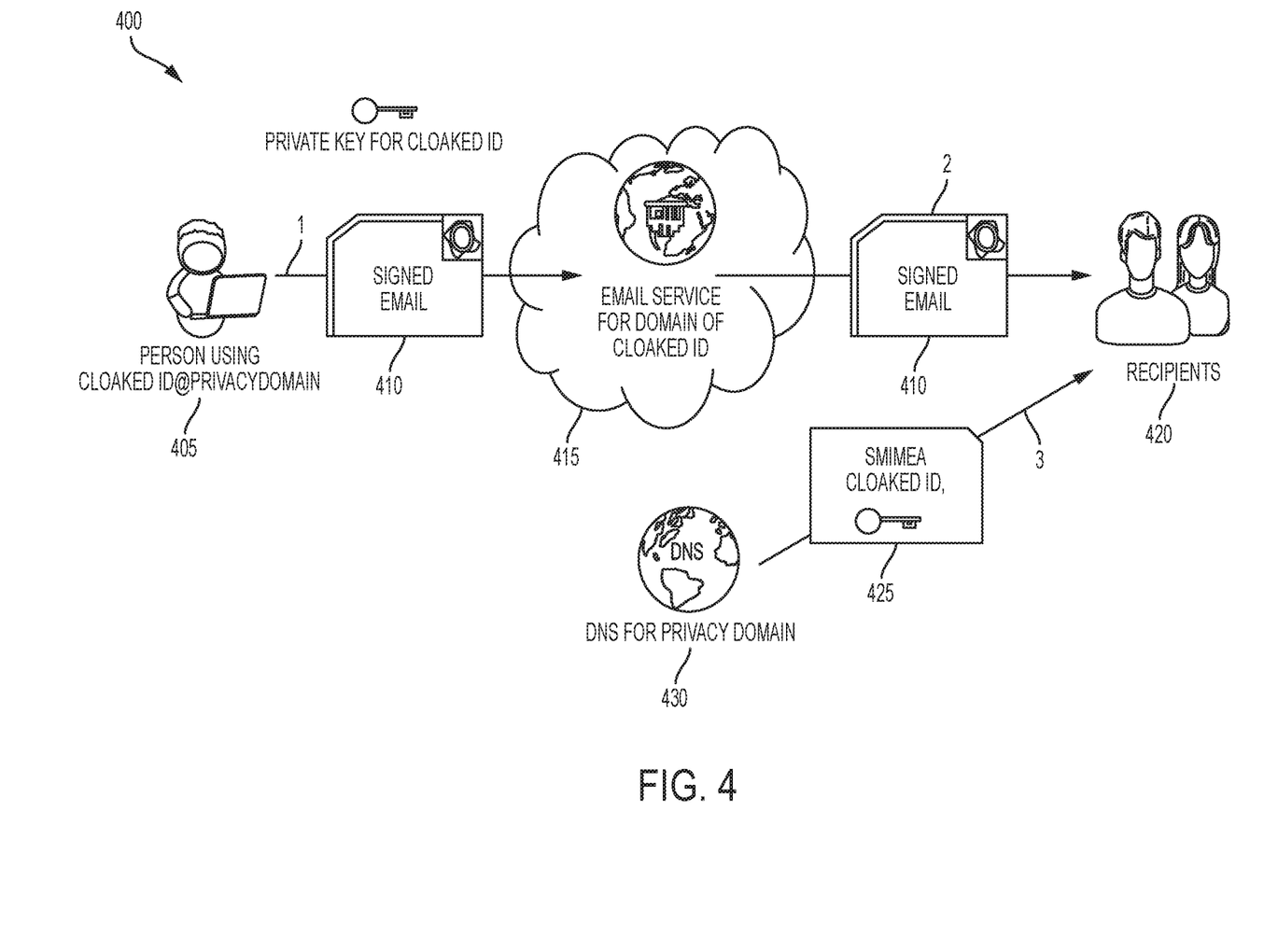
FIG. 4 shows an example email process using the cloaked ID, according to examples of the present disclosure.
Figure 5:
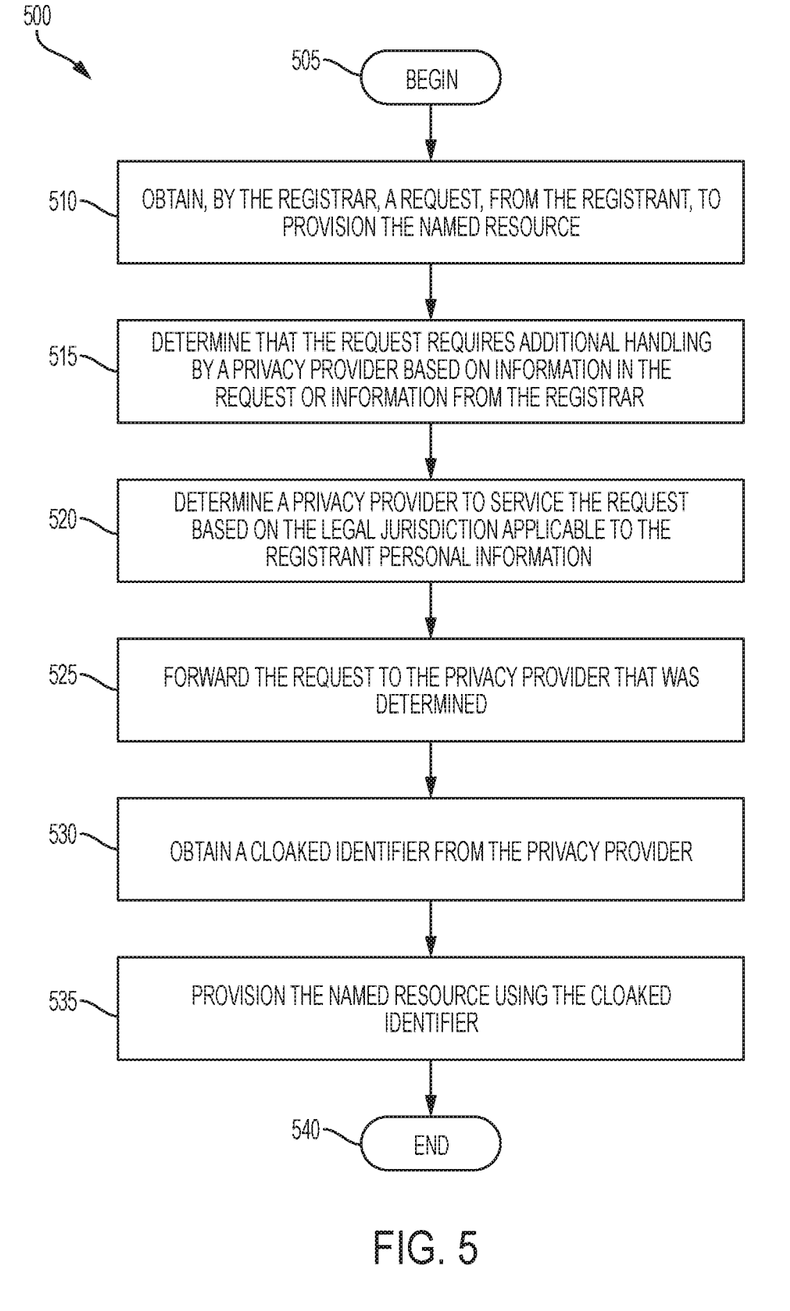
FIG. 5 shows an example method of provisioning a named resource in a DNS with a registrar while preserving privacy of a registrant, according to examples of the present disclosure.

FIG. 4 shows an example email process 400 using the cloaked ID, according to examples of the present disclosure. A user 405 creates an email 410 using an email address associated with the cloaked ID. In some examples, the cloaked ID can be part or all of the email address, such as cloakedID@PrivacyDomain as shown in FIG. 4. The email address can have a domain name element. The domain name can be one owned by the privacy provider, or alternatively, can be a domain that the registrant specified. The email 410 can be signed using the private key that corresponds to the public key registered for the cloaked ID for user 1 (shown as arrow 1). The email is sent through the email provider 415 for the privacy domain that the cloaked ID for the user 405 is in (shown as arrow 2). The recipients 420 retrieve the S/MIMEA record 425 for cloaked ID from the DNS registry 430 and uses the public key in it to verify the signature of on the email 410 (shown as arrow 3). Alternatively, the registrant can provide a public key certificate, such as a X.509 certificate, to the privacy provider or the registrar, which is signed by a trusted third party, such as a certificate authority, to exchange the public keys needed for signature verification. The privacy of the user 405 is protected so long as the user 405 does not publically associate any personal information with their cloaked ID FIG. 5 shows an example method 500 of provisioning a named resource in a DNS with a registrar while preserving privacy of a registrant, according to examples of the present disclosure. The method can begin at 505. At 510, a server of the registrar obtains a request, from the registrant, to provision the named resource. The request to provision does not contain information identifying the registrant. At 515, at least one hardware processor of the server of the registrar determines, by at least one hardware processor, that the request requires additional handling by a privacy provider based on information in the request or information from the registrar. The privacy provider is located in a legal jurisdiction that can provide privacy services based on the legal jurisdiction or jurisdictions applicable to the registrant.

At 520, at least one hardware processor of the server of the registrar determines a privacy provider from one or more privacy providers located in different geographic locations to service the request based on a legal jurisdiction that can be represented by a geographic location of the registrant. At 525, the registrar forwards the request to the privacy provider that was determined. The privacy provider can collect the legally restricted private/personal information from the registrant and store it in a location that is legally acceptable to the legal jurisdiction applicable to the registrant. At 530, the registrar obtains a cloaked identifier from the privacy provider. The cloaked identifier can be used as the identity of the registrant to contact the registrant without revealing the true identity of the registrant. Alternatively, the registrar can obtain another request, from the registrant, to provision the named resource using the cloaked identifier. At 535, the registrar provisions the named resource using the cloaked identifier. The registrar can register the cloaked identifier and a public key of the registrant in a DNS registry. The cloaked identifier and the public key of the registrant can be registered in the DNS registry using, for example, a S/MIME A-type DNS resource record. Alternatively, the registrant can provide a public key certificate, such as a X.509 certificate, to the privacy provider or the registrar, which is signed by a trusted third party, such as a certificate authority, to exchange the public keys needed for signature verification. Optionally, the registrar can provide the information to a Whois or RDAP service. At 540, the method can end.

Figure 6:
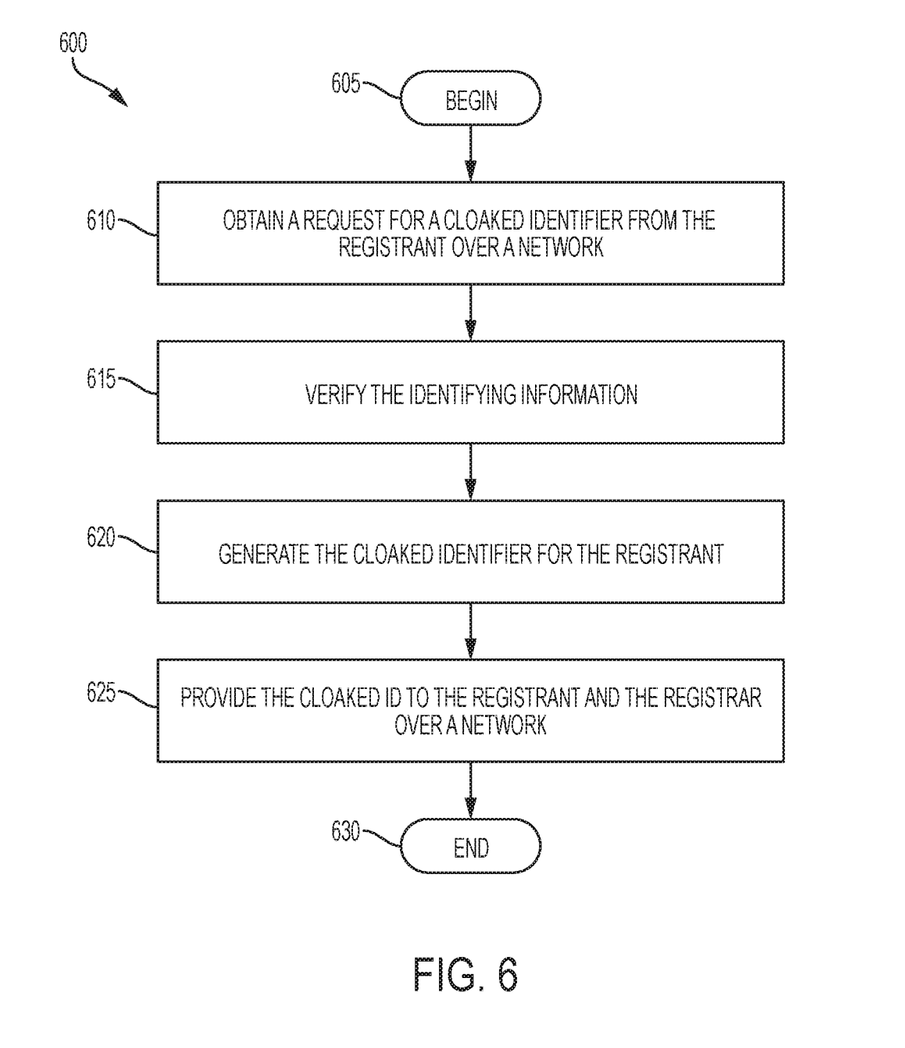
FIG. 6 shows an example method of providing privacy to a registrant by provisioning an anonymous identifier that can be used as a substitute for an identity that is considered personal or private relative to the registrant, according to examples of the present disclosure.

FIG. 6 shows an example method of providing privacy to a registrant by provisioning an anonymous identifier that can be used as a substitute for an identity that is considered personal or private relative to the registrant, according to examples of the present disclosure. The method 600 can begin at 605. At 610, a server of the privacy provider obtains, over a network, a request for a cloaked identifier from the registrant. The privacy provider is located in a legal jurisdiction that can provide privacy services based on the legal jurisdiction or jurisdictions applicable to the registrant. The request can comprise identifying information for the registrant. The identifying information can comprise contact information for the registrant. The privacy provider stores the identifying information within a jurisdiction where it is legally allowed to be stored. The privacy provider can obtain the request as a forwarded request from the registrar. At 615, the privacy provider verifies the identifying information. The privacy provider can verify the identifying information by providing a challenge to the registrant, wherein the challenge comprises an action to be performed by the registrant, and obtaining, in response to the challenge, an answer that comprises an indication that the action was performed. The privacy provider can obtain a public cryptographic key of the registrant. Other verification mechanism can also be used. At 620, the server of the privacy provider generates, by a hardware processor, the cloaked identifier for the registrant. At 625, the server of the privacy provider provides the cloaked ID to the registrant and the registrar over a network. The privacy provider can register the cloaked identifier and the public key of the registrant in a DNS registry or can be provider to the registrar to be registered in the DNS registry. The cloaked identifier and the public key of the registrant can be registered in the DNS registry using, for example, a S/MIME A-type DNS resource record. Alternatively, the privacy provider or the registrar can issue a X.509 certificate to the registrant. At 630, the method can end.

Figure 7:
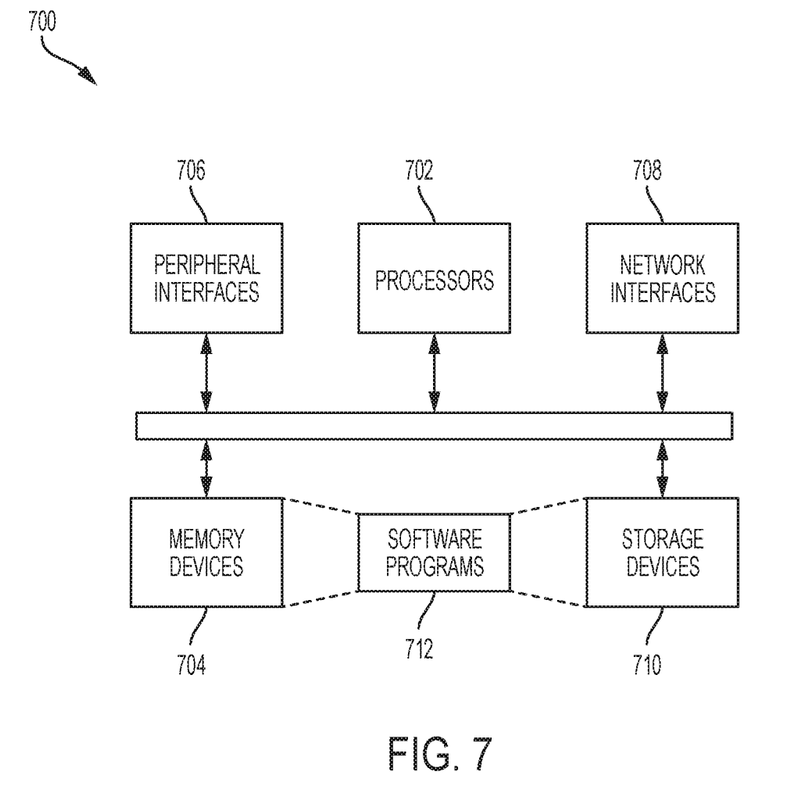
FIG. 7 is an example computer system for performing the disclosed implementations, consistent with the present disclosure.

For example, FIG. 7 illustrates an example of a hardware configuration for a computer device 700 that can be used as mobile device or server, which can be used to perform one or more of the processes described above. While FIG. 7 illustrates various components contained in the computer device 700, FIG. 7 illustrates one example of a computer device and additional components can be added and existing components can be removed.

The computer device 700 can be any type of computer devices, such as desktops, laptops, servers, etc., or mobile devices, such as smart telephones, tablet computers, cellular telephones, personal digital assistants, server(s) of the privacy provider, server(s) of the registrar, etc. As illustrated in FIG. 7, the computer device 700 can include one or more processors 702 of varying core configurations and clock frequencies. The computer device 700 can also include one or more memory devices 704 that serve as a main memory during the operation of the computer device 700. For example, during operation, a copy of the software that supports the DNS operations can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702.

Additionally, the computer device 700 can include one or more software programs 712 that enable the functionality described above. The one or more software programs 712 can include instructions that cause the one or more processors 702 to perform the processes described herein. Copies of the one or more software programs 712 can be stored in the one or more memory devices 704 and/or on in the one or more storage devices 710. Likewise, the data, for example, the DNS data, utilized by one or more software programs 712 can be stored in the one or more memory devices 704 and/or on in the one or more storage devices 710.

In implementations, the computer device 700 can communicate with other devices via a network 716. The other devices can be any types of devices as described above. The network 716 can be any type of network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, UDP, OSI, FTP, UPnP, NFS, CIFS, AppleTalk, and the like. The network 716 can be, for example, a local area network, a wide-area network, a virtual private network, the Internet, an intranet, an extranet, a public switched telephone network, an infrared network, a wireless network, and any combination thereof.

The computer device 700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method of provisioning a named resource in a domain name system ("DNS") with a registrar while preserving privacy of a registrant, the method comprising:
    obtaining, by a server of the registrar over a network, a request, from the registrant, to provision the named resource;
    determining, by at least one hardware processor of the server of the registrar, that the request requires privacy provider handling based on information in the request or information from the registrar;
    determining, by at least one hardware processor of the server of the registrar, a privacy provider from one or more privacy providers to service the request based on a location of the registrant, wherein the one or more privacy providers correspond to different legal jurisdictions, wherein the privacy provider is configured to store and manage personal information for the registrant based on provisions applicable to the registrant;
    forwarding the request to the privacy provider that was determined;
    obtaining, by the registrar, a cloaked identifier from the privacy provider; and
    provisioning the named resource in a database of a DNS registry using a unique registrant email address created based on the cloaked identifier, the provisioning comprising storing the unique registrant email address in the database of the DNS registry, the unique registrant email address comprising contact information for the registrant that conceals an identity of the registrant.

2. The method of claim 1, wherein the request to provision the named resource does not contain information identifying the registrant.

3. The method of claim 1, further comprising registering the cloaked identifier and a public key of the registrant in the DNS registry.

4. The method of claim 1, further comprising generating or provisioning a public key or a public key certificate for the registrant.

5. The method of claim 3, wherein the cloaked identifier and the public key of the registrant is registered in the DNS registry using a secure/multipurpose internet mail extensions ("S/MIME") A-type DNS resource record.

6. The method of claim 1, further comprising obtaining, by the registrar, another request, from the registrant, to provision the named resource using the cloaked identifier.

7. A method of providing privacy services to a registrant for provisioning a named resource with a registrar in a domain name system ("DNS"), the method comprising:
    obtaining, by a server of a privacy provider over a network, a request for a cloaked identifier from the registrant, wherein the request comprises identifying information for the registrant;
    managing and storing the identifying information based on provisions applicable to the registrant, the provisions associated with a legal jurisdiction of the privacy provider;
    verifying the identifying information;
    generating, by a hardware processor of the server of the privacy provider, the cloaked identifier and a unique registrant email address created based on the cloaked identifier; and
    providing the unique registrant email address to the registrant and the registrar over a network, wherein the unique registrant email address comprises contact information for the registrant that conceals an identity of the registrant.

8. The method of claim 7, further comprising obtaining a public cryptographic key of the registrant.

9. The method of claim 8, further comprising registering the cloaked identifier and the public cryptographic key of the registrant in a DNS registry.

10. The method of claim 9, wherein the cloaked identifier and the public cryptographic key of the registrant is registered in the DNS registry using a secure/multipurpose internet mail extensions ("S/MIME") A-type DNS resource record.

11. The method of claim 7, wherein the obtaining the request is forwarded from the registrar.

12. The method of claim 7, wherein the verifying the identifying information further comprises:
    providing a challenge to the registrant, wherein the challenge comprises an action to be performed by the registrant; and
    obtaining, in response to the challenge, an answer that comprises an indication that the action was performed.

13. The method of claim 7, wherein the identifying information comprises information that is required as part of a domain registration process for the registrant.

14. The method of claim 9, wherein the registering is provided to the registrar.

15. The method of claim 7, further comprising generating or provisioning a public key or a public key certificate for the registrant.

* * * * *